United States Patent Office 3,321,966
Patented May 30, 1967

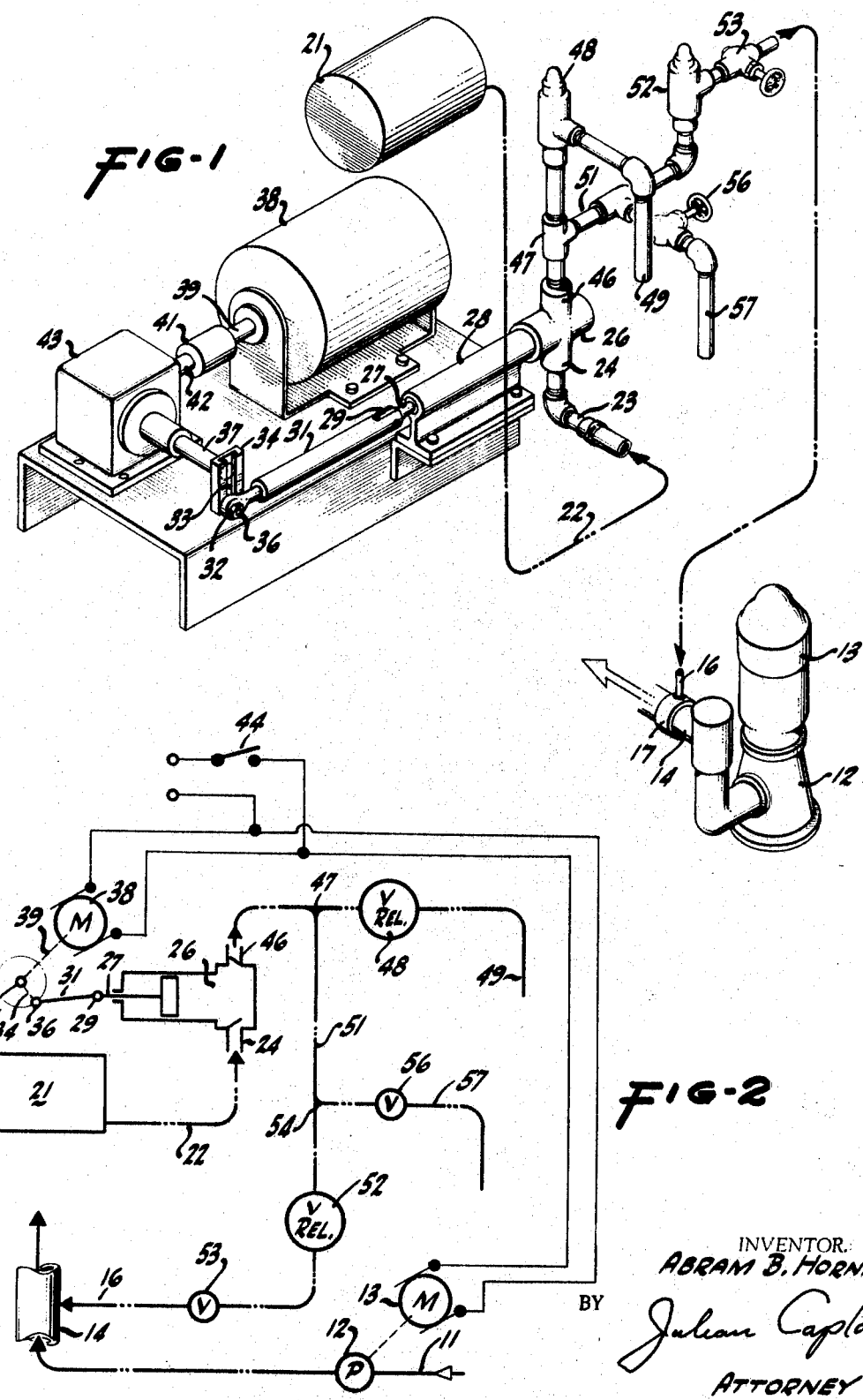

3,321,966
PUMPING SYSTEM FOR PROPORTIONAL ADDITION OF CHEMICAL TO IRRIGATION WATER
Abram B. Horner, Stockton, Calif., assignor, by mesne assignments, to Occidental Petroleum Corporation, Los Angeles, Calif., a corporation of California
Filed June 30, 1964, Ser. No. 379,195
2 Claims. (Cl. 73—168)

This invention relates to a new and improved pumping system for proportional addition of an additive to irrigation water. At the present, it is sometimes desirable to add chemicals, such as liquid fertilizers, insecticides, and nematocides to irrigation water at a rate relative to the quantity of water being pumped in accordance with a proportion recommended by the manufacturer of the chemical. The present invention provides an improved pumping system for such purpose.

More particularly, the present invention provides a variable stroke piston pump which forces a chemical under relatively high pressure through a pipe which leads ultimately to the high pressure side of the irrigation water line. A conventional sprinkler irrigation system is supplied by the irrigation water line and hence both irrigation and chemical treatment is simultaneously performed. The valves and piping hereinafter described in detail offer certain advantages over previous systems.

A primary feature of the present invention is the provision of a valve between the high pressure relief valve and the irrigation line which, when closed, causes diversion of the chemical additive through a discharge pipe. From time to time it is desirable to check the quantity of chemical additive being delivered by the pump. When the aforementioned valve is closed, the discharge line is blocked, causing the pressure relief valve to open. By collecting the discharge from the pressure relief valve in a suitable container and measuring the volume of such discharge over a measured period of time, the rate of delivery of the variable stroke pump may be tested and, if necessary, the discharge of the pump may be adjusted.

A still further feature of the invention is the installation of a second back pressure valve in the line between the pump and the irrigation water pipe. Ordinarily, the chemical additive is stored in a drum located above ground level and above the level of the irrigation pipe. If the proportioning pump is turned off and the conventional valve between the additive storage drum and the pump is unintentionally left open, by reason of the construction of the pump, liquid may flow past the pump and into the line leading from the pump to the irrigation line. This permits leakage of the chemical additive from the drum into the line which is wasteful and in fact may be harmful by permitting an excess of additive to reach the plants being irrigated. The second or low pressure relief valve in the line from the pump to the irrigation pipe will open only when the head in the pipe exceeds a predetermined pressure, which pressure is selected so that it is higher than the normal head of the storage tank above the line. It will, of course, be understood that such second pressure relief valve is so selected that its pressure is well below the discharge pressure of the proportioning pump and hence it does not interfere with passage of the chemical when the pump is actually operating.

A still further feature of the invention is the installation of a bleeder valve intermediate the two back-pressure valves which permits air to be discharged from the piping system.

Other objects of the present invention will become apparent upon reading the following specification and referring to the accompanying drawings in which similar characters of reference represent corresponding parts in each of the several views.

In the drawings:
FIG. 1 is a perspective view, partially schematic, showing the proportioning pump in accordance with this invention.
FIG. 2 is a schematic piping and electrical wiring diagram therefor.

The present invention provides a system for adding a chemical to irrigation water. The nature of the chemical is subject to wide variation but the present invention may be used to add a nematocide such as 1,2-dibromo, 3-chloropropane. Proper treatment of plants is subject to considerable variation depending upon the manufacturer's specification and the degree of infestation of the field with nematodes. However, the range per addition of such ingredient may be well below one fluid ounce of 100 gallons of water. Since the waterflow varies depending upon crop conditions, and since different chemicals require different ratios, a proportioning pump is desirable. Such a proportioning pump injects a very small quantity of additive per stroke under relatively high pressure.

Thus, as shown in the accompanying drawings, irrigation water may be drawn through a conduit 11 from a well or irrigation ditch by means of a turbine pump 12 which is driven by an electric motor 13 and discharged through a conduit 14 leading to the crop being irrigated. It is assumed that a chemical additive of the type heretofore described or a liquid fertilizer, insecticide or some similar additive is to be injected in conduit 14 through a pipe 16 which communicates with conduit 14 at fitting 17. The present invention provides a system for proportionally injecting chemical through pipe 16.

The chemical additive is stored in a tank 21 which is customarily at an elevation with respect to the fitting 17. A hose 22 and fittings 23 connect tank 21 to the inlet port 24 of pump 26. Pump 26 is of a high pressure plunger or reciprocating type having its plunger rod 27 guided by guide 28 and connected at its outer end by joint 29 to connecting rod 31. The connecting rod 31 has a bolt 36 at its end the head of which is received in a radial T-shaped slot 33 in crank arm 34. By loosening nut 32 and adjusting the position of bolt 36 in slot 33, the amplitude of stroke of plunger 27 of pump 26 may be adjusted. Shaft 37 is turned through the instrumentality of electric motor 38, the shaft 39 of which is coupled by means of coupling 41 to the input shaft 42 of a right angle reduction gear box 43. Shaft 37 is the output shaft of box 43.

As will be seen from FIG. 2, motors 13 and 38 are both connected to the same circuit and controlled by the same switch 44.

The foregoing described equipment is more or less conventional in the proportional pumping art. However, between conduit 16 and the discharge port 46 of pump 26 certain valves and fittings are installed which are novel and possess the advantages heretofore described.

Discharge port 46 is connected through fitting 47 to a high pressure relief valve 48 which opens at a pressure of, for example, 250 p.s.i. When valve 48 is open it discharges through discharge pipe 49.

Installed in line 51, which also leads from fitting 47, is a second pressure relief valve 52, which opens line 51 only when downstream pressure exceeds a set amount. The pressure at which valve 52 opens is much less than the presure at which valve 48 opens. Thus, the characteristics of valve 52 are such that it will open only when the pressure in line 51 is materially higher than the head of storage tank 21 above the fitting 17, but it will open at a much lower pressure than the discharge pressure of pump 26. Between valve 52 and fitting 17 in conduit 16 is a manual shut-off valve 53.

As an optional but highly desirable feature, a fitting 54 is installed in conduit 51 between fitting 47 and valve 52, and connected thereto is a manual bleeder valve 56 which discharges through conduit 57.

The function of bleeder valve 56 is to permit discharge of air from the discharge side of pump 26 at the time of the initial operation. Normally valve 56 is closed.

When it is desired to check the quantity of liquid being pumped by pump 26 (in other words, to check the distance of bolt 36 from the center of shaft 37) manual valve 53 may be closed. In a short time pressure builds up in conduit 51 until the pressure exceeds the setting of valve 48, whereupon valve 48 opens and all of the discharge of pump 26 passes out through pipe 49. By holding a container at the discharge 49 and collecting all of the discharge for a measured period of time, the rate of discharge of the pump may be checked. After the checking is completed, valve 53 is opened. This method of checking the rate of discharge of pump 26 is far superior to any type of checking method heretofore employed and insures that the specifications of the manufacturer of the chemical will be faithfully carried out, which is important where overdoses of harmful chemicals may affect the plant growth or even human safety.

A further feature of the invention is the installation of valve 52 in line 51. If motor 38 is turned off, the characteristics of pump 26 are such that liquid may leak through the pump and into line 51, and thence into the irrigation water line 14. This is not only wasteful, but may result in an excess of chemical being added at the time of resumption of irrigation resulting in a hazardous overdose of chemical. Valve 52 is so selected that it will remain closed despite the pressure head of tank 21. On the other hand, the characteristics of valve 52 are such that as soon as pump 26 begins operating the valve will open and not impede the discharge of additive.

Although the foregoing invention has been described in some detail, by way of illustration and example for purposes of clarity of understanding, it is understood that certain changes and modifications may be practiced within the spirit of the invention and scope of the appended claims.

What is claimed is:

1. A pumping system comprising a tank 21 of additive, a pipeline for fluid 14, a first pump 12 pumping fluid through said pipeline, a variable rate of positive displacement discharge second pump 26 having its intake drawing additive directly and solely from said tank and having its discharge connected to a discharge line 51 leading to said pipeline at a discharge point 17 to discharge additive into said pipeline on the discharge side of said first pump, a motor for said second pump, said tank elevated above said second pump and above said discharge point to establish a static head of additive both at said second pump and at said discharge point, a pressure relief valve 52 in said discharge line between said second pump and said discharge point having an opening relief pressure substantially less than the discharge pressure of said second pump and substantially greater than the static head of additive at said pressure relief valve, whereby, when said second pump is inoperative, flow of additive through said dischareg line from said tank to said discharge point is stopped by said pressure relief valve, said pipeline being isolated from the intake of said second pump, said second pump being driven independently of pressure in said pipeline.

2. A system according to claim 1, which further comprises a shutoff valve 53 in said discharge line between said discharge point and said first mentioned pressure relief valve, a discharge pipe 49 connected to said discharge line 51 at a point between said pump 26 and said shutoff valve, and a second pressure relief valve 48 in said discharge pipe, the opening relief pressure of said second pressure relief valve being substantially less than the discharge pressure of said pump and substantially greater than the pressure in said pipeline, whereby upon closing of said shutoff valve when said pump is operating the total discharge of said pump is diverted through said discharge pipe for measurement of said total discharge over a measured time interval.

References Cited
UNITED STATES PATENTS

| | | | |
|---|---|---|---|
| 1,217,958 | 3/1917 | Klahre | 103—42 |
| 1,481,901 | 1/1924 | Kapgood | 103—42 |
| 1,801,414 | 4/1931 | Davis | 103—42 XR |
| 2,529,028 | 11/1950 | Landon | 137—565 X |
| 2,826,067 | 3/1958 | Braunlich | 73—168 |
| 3,179,291 | 4/1965 | Umbach et al. | 73—168 XR |

DAVID SCHONBERG, *Primary Examiner.*